July 13, 1943. J. FREI, JR 2,324,380
APPARATUS FOR SLITTING PAPER
Filed April 6, 1942
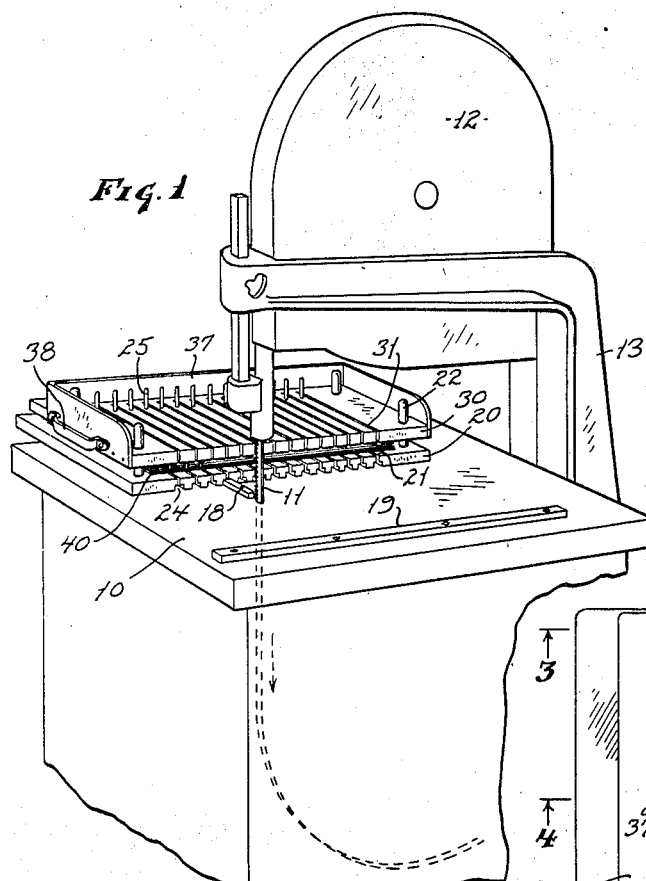
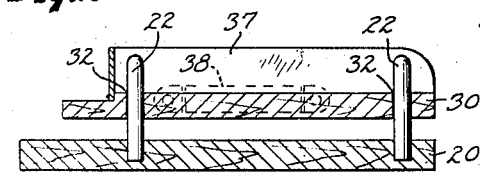
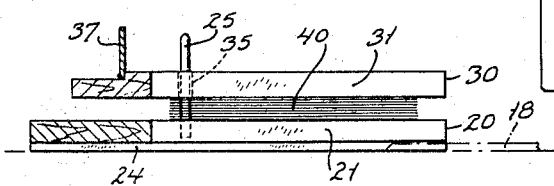
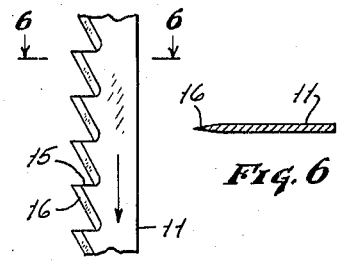
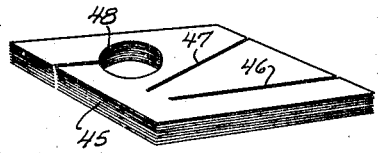
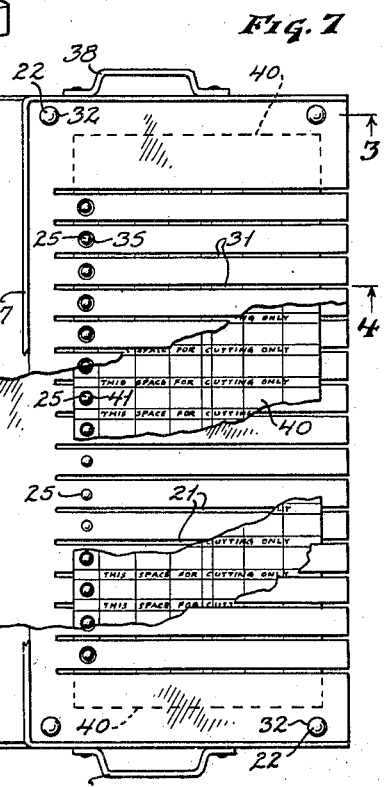
INVENTOR.
John Frei, Jr.
BY Bates, Teare & McBean
Attorneys Patented July 13, 1943

2,324,380

UNITED STATES PATENT OFFICE 2,324,380

APPARATUS FOR SLITTING PAPER

John Frei, Jr., Chicago, Ill., assignor to The W. S. Gilkey Printing Company, Cleveland, Ohio, a corporation of Ohio Application April 6, 1942, Serial No. 437,759

10 Claims. (Cl. 164—35)

This invention relates to an apparatus for slitting paper or similar material, more particularly, for slitting a pile of sheets, at one time, in a definite region. The invention is especially useful for severing a pile of record sheets into individual strips, which I accomplish at a great saving of time over present method of slitting sheets individually by shears or cutting knives. The invention, however, has a variety of uses and may be employed, for instance, for slitting a stack of sheets on straight lines clear across the sheet, entirely severing it into individual strips, or slitting it only part way to enable strips to be readily detached or for forming slits of some other character or shape.

My apparatus comprises a cutting member, which may be similar to a band saw, but with the teeth in the opposite direction from the ordinary band saw and with the inclined edge of the teeth sharpened, and a jig or holder adapted to clamp a block of sheets, and the means to guide the same as desired so that the cutting blade may perform successive inclined cuts on the sheets of paper as they are fed across the blade.

In carrying out my invention for cutting parallel slits through a stack of paper forms, I provide a two-part jig comprising plates adapted to be held one above the other with registering slots in them. I provide means for guiding such jig on the table of the endless cutting band, so that an upper and under slot in the jig will be registered with the band, enabling the jig with its enclosed stack of sheets to be shoved across the band, which thus slits the sheets in line with the upper and under slot.

My invention is hereinafter more fully explained in connection with a preferred embodiment illustrated in the drawing, and the essential novel features of the invention are summarized in the claims.

In the drawing, Fig. 1 is a perspective of my apparatus with the jig in position to feed the embraced stack of sheets across the blade; Fig. 2 is a plan of the jig, intermediately broken away to show the lower member of the jig, the stack of forms and the upper member; Figs. 3 and 4 are cross sections of the jig on the correspondingly numbered lines on Fig. 2; Fig. 5 is a fragmentary side elevation of the cutting blade; Fig. 6 is a cross section of the blade as indicated by the line 6—6 in Fig. 5; but on a larger scale; Fig. 7 is a diagram of a stack of sheets showing slits of various forms made by my apparatus.

As shown in Fig. 1, 10 designates the table of the slitting machine, 11 the endless slitting blade which passes flatwise around a pulley within an upper housing 12 carried by a frame arm 13, and around another pulley within the base of the machine after the manner of a band saw, neither pulley nor the driving mechanism being shown.

The blade, however, is quite different from that of a band saw in two particulars; first, the horizontal edges 15 of the successive teeth constitute their tops instead of their bottoms, and, second, the inclined edges 16 are sharpened to a knife edge, as shown in Figs. 5 and 6. The blade moves downwardly toward the table, as in a band saw, but the edge to engage the paper is the inclined sharpened edge which may thus form a gradual cut across the paper.

The jig of this invention comprises a bottom plate adapted to support the stack of sheets and a top plate 30 to rest thereon, each of them having a slot extending part way across the plate and adapted for the passage of the blade. As shown in Figs. 1, 2 and 4, the bottom plate 20 has a series of parallel slots 21 therein and the top plate 30 a series of correspondingly spaced slots 31. Suitable dowel pins 22 carried by the plate 20 are adapted to be received in registering openings 32 in the top plate, so that the slots of the upper plate stand directly over those of the under plate.

In the underside of the under plate 20 are grooves 24, one for each slot 21, but wider than the slots. Any of these grooves is adapted to embrace a stationary guiding strip 18 on the table of the machine in alignment with the blade 11. Accordingly, when the jig is placed on the table and shoved toward the blade, the movement will be parallel with the slots and the particular slots above the guiding strip 18 will receive the blade and thus slit the paper in line with those slots. A suitable stop is provided in the form of a strip 19 secured to the table of the machine to limit the movement before the rear ends of the slots 21, 31 have reached the blade.

It will be seen that with the apparatus described I can very quickly cut a large number of parallel slots across the stack of the sheets. For instance, the jig with its embraced paper sheets may be placed with the endmost groove 24 in the under jig in registration with the guiding rib 18, and then the jig shoved forwardly to cut the stack of paper; then the jig is withdrawn and moved laterally to place the next groove in registration with the guide 18, the next slit made, and so on until the entire stack is slitted as desired.

In Fig. 2, I have indicated the jig as especially designed for slitting a stack of forms which are to be cut into narrow strips, such forms being customarily used for keeping records of freight cars in their travel from place to place. The data is usually applied to several surmounting sheets with intervening carbon sheets, and then the forms are slit to produce a number of narrow strips for subsequent distribution. It is customary to provide each form with a series of holes adjacent its left hand margin, there being one hole for each strip, so that when the form is cut up the strips may conveniently be stacked on suitable rods.

When the jig is intended for the purpose mentioned, I make the slits longer than the width of the paper sheets, and I provide the bottom member 20 with a row of pegs 25, one in each zone between slots and each adapted to register with a corresponding hole in the form, these pegs passing freely through holes 35 in the upper member of the jig when it is in place. This is illustrated in Fig. 2 where 40 indicates the stack of forms to be cut into individual strips, the cutting to be along the narrow space which is designated on the form by the words "This space for cutting only." Cutting in these spaces leaves the material between the spaces in the form of narrow strips, each having a filing hole 41 adjacent the end.

As a protection to the user, enabling him to feed the jig rapidly and safely across the blade, I provide a wall carried by the upper plate, rising a short distance above it adjacent its rear edge and extending onto opposite ends. This wall is shown in the drawing as a sheet metal member 37.

I provide handles at opposite ends of the jig, which are of assistance to the operator in enabling him to hold the jig firmly on the table as well as to shove it forwardly. These handles are shown as bail-like members 38 secured to the end portions of the protecting wall 37.

The jig described, enables a stack of forms, or other sheets to be cut, to be readily clamped between the upper and under members of the jig, and then slitted with great rapidity, since the blade is continually moving in the downward or cutting direction and it is merely necessary to register the jig with its guide, shove it forward to the limit, withdraw it, re-register it, shove it forward, and so on until the slitting is completed. At the end of the operation the removal of the upper member leaves each stack of individual strips in its proper location on the corresponding pin 25, ready for subsequent distribution as desired.

While the specific jig shown in Figs. 1 and 2 is designed for making a succession of parallel slits across a stack of forms, the same system of slitting may be applied to other uses, the jig being correspondingly changed. For instance, in Fig. 7, I have shown at 45 a stack of sheets having one slit partway across at right angles to the leading edge, as indicated at 46, and another slit extending in a diagonal direction, as indicated at 47, and a third cut 48 which passes from the edge inwardly and then makes a complete circuit through the stack of sheets.

The jig and its guide for effecting such cuts, as illustrated in Fig. 7, will be correspondingly changed from the specific jig and guide shown in Figs. 1 and 4. In each case there will be an upper and under plate having registering slots positioned according to the slit to be cut in the paper, and the guiding means will direct the jig and the sheets against the blade while holding it in such position in reference to the blade that the travel of the jig is parallel with the guiding slots therein.

I claim:

1. In an apparatus for slitting sheets, a portable jig comprising upper and under plates, said plates provided with registering slots, and a series of grooves in the underside of the under plate each adapted to register with a guiding rib on a table.

2. In a slitting apparatus, the combination of a table, an endless band having cutting teeth moving downwardly through the table, a jig movable with reference to the table and having upper and under plates, a series of slots in the upper and under plates, pins on one of the plates occupying openings in the other to cause the slots in the two plates to register, and a series of grooves on the underside of the bottom plate registering with the slots theerof, and a guiding rib on the table adapted to coact with any of the grooves.

3. In an apparatus for slitting sheets, a jig comprising upper and under plates having registering slots through them, one of the plates having a transverse row of pins individually located in the space between slots, and the other plate having openings to receive the pins.

4. In an apparatus for slitting sheets, a portable jig comprising upper and lower plates adapted to hold a stack of sheets between them, slots in said plates, mutually coacting means on the plates for holding the slots in registration, a cutting blade, a supporting table transverse of the blade and having a guiding rib, and a groove in the underside of the bottom plate of the jig, said rib and groove being so located with reference to the cutting blade and the slots as to slidably guide a pair of slots in registration of the blade.

5. The combination of a slitting blade having teeth with inclined sharpened edges, a table, means for moving the blade downwardly through the table, a guiding rib on the table in alignment with the blade, a portable jig for a stack of sheets to be slitted, comprising upper and under plates adapted to hold a pile of sheets between them, said plates having parallel slots extending transversely of the plates from one edge thereof and terminating short of the opposite edge, mutually coacting means on said plates located beyond the opposite ends of the slotted region for maintaining the slots of one plate in registration with those of the other, and a series of grooves in the underside of the under plate extending in registration with the slots and wider than the slots and adapted to receive the guiding rib on the table, whereby any pair of upper and lower slots may be selected and guided across the blade.

6. A portable jig for sheets to be slitted comprising upper and under plates adapted to hold sheets between them, said plates having slots extending through them from one edge part-way to the opposite edge, mutually coacting means on the two plates beyond the region of the slots for holding the plates in such mutual position that the slots of one plate register with the slots of the other plate, and a row of pins on one plate transverse of the slots, each pin being positioned between a pair of adjacent slots.

7. In an apparatus for slitting sheets having a series of holes near one edge thereof, a jig comprising a plate adapted to support a stack of such sheets, means for clamping the stack thereon, a series of pins near an edge of the plate and adapted to project through said holes, there being a series of slots in said plate open at the ends distant from the pins and holes respectively, said slots extending across the plate between the pins and holes and terminating beyond the pins, whereby a slitting blade may enter the slots and sever the sheets into individual strips each of which is mounted on a pin.

8. In an apparatus for slitting sheets having a series of holes near one edge thereof, a jig comprising upper and lower plates adapted to clamp a stack of such sheets between them, a series of pins near an edge of one plate and adapted to project through said holes and through registering holes in the other plate, and a series of slots in each plate, those in one plate registering with those in the other and open at the ends distant from the pins and holes respectively, said slots extending across the plates between the pins and holes and terminating beyond the pins, whereby a slitting blade may enter the pairs of registering slots and sever the sheets into individual strips each of which is mounted on a pin.

9. In an apparatus for slitting sheets having a series of holes near one edge thereof, a jig comprising upper and lower plates adapted to clamp a stack of such sheets between them, a series of pins near an edge of one plate and adapted to project through said holes, a series of slots in each plate, those in one plate registering with those in the other and open at the ends distant from the pins and holes respectively, said slots extending across the plates between the pins and holes and terminating beyond the near edge of the stack of sheets, and a series of grooves in the jig, any of which may slidably register with a fixed rib on a slitting table, whereby a slitting blade passing through the table may enter any of the pairs of registering slots and sever the sheets into individual strips each of which is mounted on a pin.

10. An apparatus for slitting sheets comprising a table, a blade formed as an endless band passing downwardly through an opening in the table and having teeth with horizontal portions at the top and inclined portions extending from the top edge downwardly and sharpened, a removable jig adapted to hold a stack of paper, means for slidably guiding the jig on the table parallel with the top thereof and toward the blade, said jig having top and bottom plates with registering slots adapted to receive the blade as the jig is shoved across the blade.

JOHN FREI, Jr.